United States Patent
Murakami et al.

(10) Patent No.: US 7,048,278 B2
(45) Date of Patent: May 23, 2006

(54) COMPOUND SHEET GASKET

(75) Inventors: Yasunori Murakami, Wako (JP); Yoshiari Takagi, Wako (JP); Takeshi Hiramatsu, Wako (JP); Toshihiko Matsubara, deceased, late of Kawagoe (JP); Hiroko Matsubara, legal representative, Kawagoe (JP); Noriyuki Deguchi, Saitama (JP); Yoshiaki Hamada, Saitama (JP)

(73) Assignees: Honda Giken Kogyo Kabushiki Kaisha, Tokyo (JP); Nippon Leakless Industry Co., Ltd., Saitama (JP)

( * ) Notice: Subject to any disclaimer, the term of this patent is extended or adjusted under 35 U.S.C. 154(b) by 0 days.

(21) Appl. No.: 09/968,867

(22) Filed: Oct. 3, 2001

(65) Prior Publication Data

US 2002/0089126 A1   Jul. 11, 2002

(30) Foreign Application Priority Data

Oct. 4, 2000   (JP)   ............................. 2000-304757

(51) Int. Cl.
*F02F 11/00*   (2006.01)
(52) U.S. Cl. ................. 277/592; 277/627; 277/650; 277/654
(58) Field of Classification Search ............... 277/592, 277/627, 650, 654
See application file for complete search history.

(56) References Cited

U.S. PATENT DOCUMENTS

| | | | | |
|---|---|---|---|---|
| 3,873,168 A | * | 3/1975 | Viola et al. ............... | 308/238 |
| 4,402,518 A | * | 9/1983 | Locacius .................. | 277/166 |
| 4,736,956 A | * | 4/1988 | Yoshijima et al. ........ | 277/22 |
| 4,776,602 A | * | 10/1988 | Gallo ....................... | 277/233 |
| 5,128,209 A | * | 7/1992 | Sakai et al. .............. | 428/421 |
| 5,137,283 A | * | 8/1992 | Giarrusso et al. ......... | 277/1 |
| 5,330,200 A | * | 7/1994 | Unseth ..................... | 277/9 |

(Continued)

FOREIGN PATENT DOCUMENTS

| | | |
|---|---|---|
| JP | 2-59362 | 4/1990 |
| JP | 03-144172 | 6/1991 |
| JP | 03-248837 | 11/1991 |
| JP | 3-124075 | 12/1991 |
| JP | 04-078378 | 3/1992 |

(Continued)

OTHER PUBLICATIONS

Wypych, George, Handbook of Fillers, ChemTec Publishing, second edition, chapter 2.*

(Continued)

*Primary Examiner*—Chuck Y. Mah
*Assistant Examiner*—Michael J. Kyle
(74) *Attorney, Agent, or Firm*—Armstrong, Kratz, Quintos, Hanson & Brooks, LLP

(57) ABSTRACT

A compound sheet gasket which exhibits superior sealing durability to fretting is provided. The compound sheet gasket is mounted between a housing and a cover provided at an opening of the housing, and the friction coefficient of any one surface of a front surface adhered to the housing by the flexibility thereof and a rear surface adhered to the cover by the flexibility thereof, is set to be 1.15 times or more that of the other.

16 Claims, 3 Drawing Sheets

U.S. PATENT DOCUMENTS

| | | | |
|---|---|---|---|
| 5,443,887 A | 8/1995 | Nakao | |
| 5,722,670 A * | 3/1998 | Novak et al. | 277/235 |
| 5,749,996 A | 5/1998 | Tomizawa et al. | |
| 5,891,538 A * | 4/1999 | Yamamoto et al. | 428/36.9 |
| 5,992,857 A * | 11/1999 | Ueda et al. | 277/592 |
| 6,284,360 B1 * | 9/2001 | Johnson et al. | 428/317.7 |
| 6,334,615 B1 * | 1/2002 | Uchiyama et al. | 277/376 |
| 6,399,204 B1 * | 6/2002 | Shekleton et al. | 428/408 |

FOREIGN PATENT DOCUMENTS

| | | |
|---|---|---|
| JP | 06-050092 | 2/1994 |
| JP | 11-071575 | 3/1999 |

OTHER PUBLICATIONS

Castelli, Vittorio (Rino), Marks' Standard Handbook for Mechanical Engineers, McGraw-Hill, tenth edition, chapter 3.*

SCLAIR® Polyethylene, 11J1 LLDPE, material properties, Nov. 17, 1999.* www.matlab.com, "Overview—Polyester Film", material properties for polyester film.*

* cited by examiner

Fig. 3A
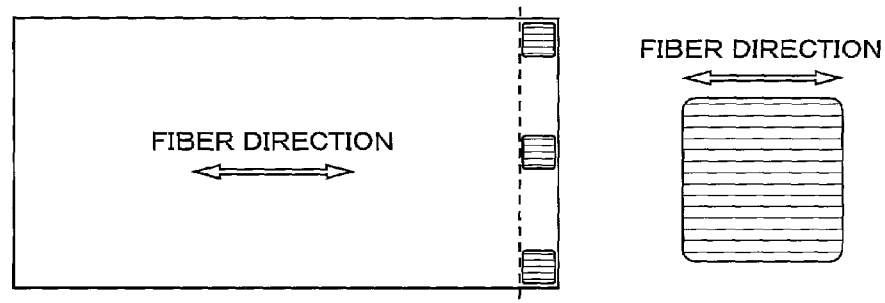
Fig. 3B
Fig. 4A
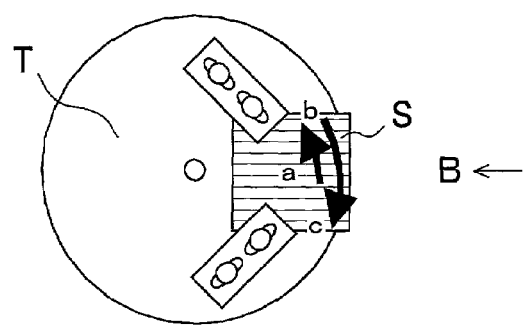
Fig. 4B
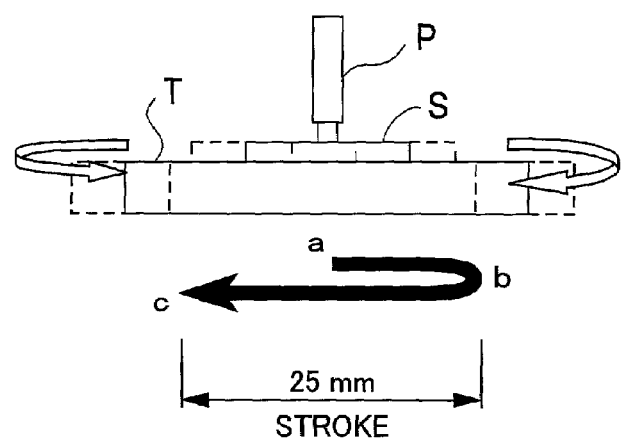

COMPOUND SHEET GASKET

BACKGROUND OF THE INVENTION

The present invention relates to a compound sheet gasket which is mounted, for example, between a transmission housing and a cover, for blocking an opening at a brim of the housing, and in particular, relates to a technology for maintaining superior sealing properties which prevent the compound sheet gasket from being damaged by fretting.

Generally, heat resistance is not required in a gasket used in a transmission housing for automobiles, or the like, since the internal oil temperature is about 140 to 150° C. Therefore, as the gasket, an inexpensive sheet gasket consisting of nonmetal compound material sheets can be used, and a metallic gasket having a bead such as a gasket for an internal combustion engine cannot be used. The sheet gasket is mounted between flanges formed at brims of a housing and a cover and is adhered to the flanges due to the flexibility thereof, and it thereby prevents transmission oil from leaking.

FIGS. 5A, 5B, 6A, and 6B are drawings showing states in which a conventional sheet gasket is mounted in a transmission housing. In the figures, numeral 1 is a flange of the transmission housing and numeral 2 is a flange of the cover. A sheet gasket 3 is mounted between these flanges 1 and 2 and is tightly fastened by bolts 4.

Fretting occurs between the flanges 1 and 2 due to external stresses, thermal expansion, vibrations, or the like, which affect the transmission housing. As shown by the double-headed arrows in the figures, sliding occurs on the front surface and the rear surface of the sheet gasket by this fretting, and during this time, the sheet gasket is often shifted from an original position by friction resistance (shown by two arrows in the figure) which occurred due to the sliding, as shown in FIG. 6A. Consequently, there was a problem in that sealing was remarkably lowered by the occurrence of deformations or cracks in the sheet gasket.

Therefore, the following countermeasures were considered in order to overcome the above problem.

① The fastening axial force is increased by increasing the number of fastening bolts as well as increasing the rigidity of the flanges, and the fastening bearing is increased and the fretting amount is reduced.

② The proof stress for fretting is improved by increasing the mechanical strength of the sheet gasket.

③ An interfitting structure such as a knocking pin, etc., is provided on a butting portion of the flanges, and the fretting in the flange plane is reduced.

④ The frictional force which occurred due to fretting is reduced on the surface of the sheet gasket by coating a solid lubricant, such as graphite, molybdenum disulfide, etc., and the stress which affects the sheet gasket is reduced.

However, the above countermeasures have the following problems, respectively.

① Addition of Fastening Bolts and Improvement in Rigidity of Flange

The manufacturing cost is increased by complicating the fastening structure of the flanges, and moreover, the weight is increased by the increase in number of parts and increase in size of the parts.

② Improvement in Strength of Sheet Gasket

The compressibility is reduced by increasing the strength of the sheet gasket, and thereby the sealing property is deteriorated and the weight is increased.

③ Interfitting Mechanism

The manufacturing cost is increased by complicating the flange structure and by increasing the number of parts.

④ Coating of Solid Lubricant

By excessively increasing the sliding between the sheet gasket and the flange, the fretting amount is increased and deformation is promoted if the strength of the sheet gasket is low.

In addition, as disclosed in Japanese Utility Models Unexamined Publications Nos. 2-59362 and 3-124075, technologies constituted so that a metal gasket may slip off either of a cylinder head or cylinder block due to differences between friction resistances of the front surface and the rear surface of the metal gasket, are proposed in the technological field of metal gaskets. However, in either proposed technology, the difference in the friction resistance is not quantitatively analyzed, and it is not clear whether the above problem can be overcome by applying such technology to a sheet gasket.

Therefore, it is an object of the present invention to provide a compound sheet gasket which exhibits superior sealing durability to fretting.

SUMMARY OF INVENTION

The present inventors have quantitatively analyzed the differences in friction coefficient between the front surface and the rear surface in a sheet gasket, and consequently, they have found a compound sheet gasket in which durability to fretting can be remarkably improved by setting the friction coefficients to be larger than a specific difference. A compound sheet gasket according to the present invention was made based on the above-described knowledge, and it is mounted between a housing and a cover provided at an opening of the housing and is characterized in that a first layer adhered to the housing by the flexibility thereof and a second layer adhered to the cover by the flexibility thereof are provided, and that the friction coefficient of any one of the surface of the first layer and the second layer is set to be 1.15 times or more that of the other.

According to the compound sheet gasket as described above, sliding occurs between a surface having a small friction coefficient and one counterpart, and change does not occur in an original positional relationship between the compound sheet gasket and the other counterpart, even if relative movement occurs between the housing and the cover by fretting. Therefore, the sealing property can be maintained, since movement of the compound sheet gasket is suppressed and the deformation and damage thereof also are suppressed. In the following, preferable embodiments of the present invention will be explained.

The compound sheet gasket may be constituted by fixing a first layer and a second layer on the front surface and the rear surface of a base layer, respectively, or by only a first layer and a second layer. In the first layer, the second layer, and the base layer, a mixture of a mixed binder with reinforcing fibers and heat resistance filler can be employed. Then, a compound sheet may be formed by laminating such a mixture while heating and pressing, using, for example, a calender roll. A compound sheet gasket can be produced by punching out this sheet in a specific shape. Specifically, a mixture for the first layer filled in a hopper is continuously inserted on the surface of an upper roll while the calender roll is rotating, and it is thinly extended by the upper roll and an under roll while heating and pressing, and is then wound around the upper roll, so as to produce a round peripheral thereof. Next, a mixture for the base layer and a mixture of the second layer are wound and laminated on the peripheral surface of the first layer in order, in the same manner as that of the first layer, and are then peeled off the upper roll by cutting in the axial direction of the roll, and therefore, a compound sheet consisting of the first layer, the base layer, and the second layer is obtained. A compound sheet consisting of only the first layer and the second layer can also be produced by laminating the first layer and the second layer in this order. In addition, a compound sheet can also be produced by separately producing sheets of the first layer, the second layer, and the base layer, respectively, and by heating and pressing these sheets. Furthermore, a compound sheet can also be continuously produced by forming any one sheet of the first layer, the second layer, and the base layer, and by laminating mixtures on the sheet, in the same manner as described above using a calender roll.

As a base layer, a sheet in which the mechanical strength is improved by mixing more reinforcing fibers than in the first layer and the second layer, or a synthetic resin film made of triacetylcellulose, polycarbonate, polyimide, etc., can be employed. As a binder, a mixture consisting of at least one kind of synthetic rubber such as NBR rubber, NR rubber, SBR rubber, CR latex, etc., can be employed. As reinforcing fibers, aramid fiber is preferred. As a heat resistance filler, powders such as those of mica, clay, graphite, silica, barium sulfate, calcium carbonate, magnesium carbonate, molybdenum disulfide, etc., can be employed. As a friction coefficient reducing agent, PTFE (polytetrafluoroethylene) powder can be employed.

The friction coefficients of the first layer surface and the second layer surface can be adjusted by appropriately selecting the ratio of synthetic rubber and aramid fiber which is the reinforcing fiber. In order to make the friction coefficient of any one surface of the first layer and the second layer to be 1.15 times or more that of the other, the content of synthetic rubber in one layer having a higher friction coefficient is set to be larger than that of the other layer, one layer having a higher friction coefficient contains aramid fiber at 0 to 10% by weight, and the other layer contains aramid fiber at 10% by weight or more.

Here, the lower friction coefficient is preferably in the range of 0.3 to 0.5. When the friction coefficient is below 0.3, resistance to fretting is insufficient. In contrast, when the friction coefficient exceeds 0.5, the sliding property relative to a counterpart is deteriorated. In addition, it is preferable that the higher friction coefficient be 0.4 or more, in order to suppress the sliding relative to the counterpart.

BRIEF DESCRIPTION OF THE DRAWINGS

FIG. 3A shows a plan view of a compound sheet produced in Examples of the present invention, and FIG. 3B shows a plan view of a sample punched out from the compound sheet;

FIG. 4A shows a plan view of a friction coefficient measuring device, and FIG. 4B shows a partial view taken in the direction of arrow B in FIG. 4A;

DETAILED DESCRIPTION OF THE PREFERRED EMBODIMENTS

Figure 1:
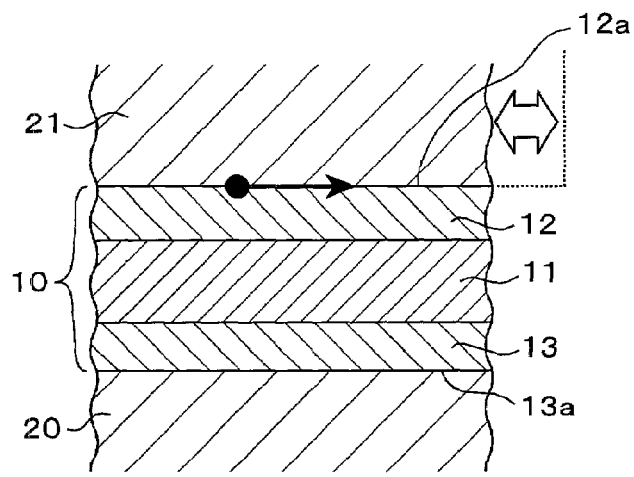
FIG. 1 shows a schematic cross-sectional drawing of a state in which a compound sheet gasket according to an embodiment of the present invention is mounted between flanges.

Next, FIG. 1 shows a drawing of a compound sheet gasket 10 of an embodiment of the present invention, and it shows a state in which the compound sheet gasket 10 is fastened by a flange 20 of a transmission housing and a flange 21 of a cover. The compound sheet gasket 10 is constituted by fixing a front surface layer 12 (first layer) and a rear surface layer 13 (second layer) on the front surface and the rear surface of a base layer 11, respectively. Then, the ratio of friction coefficient of the rear surface 13a on the rear surface layer 13 to the friction coefficient of the front surface 12a on the front surface layer 12 (the rear surface to the front surface) is set to be 1.15 or more.

In the compound sheet gasket 10 as constituted above, by fastening a fastening bolt (not shown) screwed on the flange 20 through the flange 21, the compound sheet gasket 10 is pressed in the thickness direction and the front surface 12a and the rear surface 13a thereof are adhered to end surfaces of the flanges 21 and 20, and the flanges 21 and 20 are sealed. Then, even if fretting, shown by a double-headed arrow in FIG. 1, occurs between the flanges 20 and 21, sliding occurs between the surface 12a having a small friction coefficient and the flange 21 of the cover, as shown by the arrow in FIG. 1, and only the flange 21 moves, and thereby, the compound sheet gasket 10 is fixed on the flange 20 of the transmission housing. Therefore, deformation and damage to the compound sheet gasket 10 are also suppressed by suppressing the movement, and the sealing property can be maintained.

In this embodiment, although the front surface 12a of the compound sheet gasket 10 having a small friction coefficient is contacted with the flange 21 of the cover, the front surface 12a may be contacted with the flange 20. However, this case is not very suitable, since fretting may occur between the compound sheet gasket 10 and the flange 21 by moving the compound sheet gasket 10 with the flange 21 of the cover.

EXAMPLES

In the following, the present invention will be explained in more detail by referring to specific Examples.

A. Production of Compound Sheet

A front surface layer and a rear surface layer having compositions shown in Table 1 are formed on the surface of a base layer having a thickness of 0.4 mm, and therefore, a compound sheet having a thickness of 0.5 mm of Example 1 was produced. In this case, reinforcing fibers are orientated so as to extend parallel to the longitudinal direction of the compound sheet, since the reinforcing fibers are orientated in the rotation direction of a calender roll. Compound sheets of Examples 2 to 6 were produced in the same manner as that of Example 1, except that the compositions of the front surface layer and the rear surface layer were changed to those shown in Tables 2 to 6. In addition, Compound sheets of Comparative Examples 1 to 5 were produced in the same manner as that of Example 1, except that the compositions of the front surface layer and the rear surface layer were changed to those shown in Tables 7 to 11.

Example 1

TABLE 1

| Ratio of Friction Coefficient | 1.291 | | | |
|---|---|---|---|---|
| Gasket Surface | Front Surface Layer | | Rear Surface Layer | |
| Friction Coefficient | 0.461 | | 0.595 | |
| Composition of Gasket | NBR Rubber | 6% | NBR Rubber | 30% |
| | NR Rubber | 6% | Aramid Fiber | 5% |
| | Aramid Fiber | 15% | Clay Powder | 65% |
| | Mica Powder | 73% | | |

Example 2

TABLE 2

| Ratio of Friction Coefficient | 1.525 | | | |
|---|---|---|---|---|
| Gasket Surface | Front Surface Layer | | Rear Surface Layer | |
| Friction Coefficient | 0.318 | | 0.485 | |
| Composition of Gasket | NBR Rubber | 6% | NBR Rubber | 25% |
| | NR Rubber | 6% | Aramid Fiber | 5% |
| | Aramid Fiber | 13% | Silica Powder | 40% |
| | Clay Powder | 50% | Clay Powder | 30% |
| | Graphite Powder | 25% | | |

Example 3

TABLE 3

| Ratio of Friction Coefficient | 1.347 | | | |
|---|---|---|---|---|
| Gasket Surface | Front Surface Layer | | Rear Surface Layer | |
| Friction Coefficient | 0.498 | | 0.671 | |
| Composition of Gasket | NBR Rubber | 6% | NBR Rubber | 40% |
| | NR Rubber | 6% | Aramid Fiber | 2% |
| | Aramid Fiber | 15% | Silica Powder | 34% |
| | Clay Powder | 43% | Barium Sulfate Powder | 24% |
| | Silica Powder | 30% | | |

Example 4

TABLE 4

| Ratio of Friction Coefficient | 1.479 | | | |
|---|---|---|---|---|
| Gasket Surface | Front Surface Layer | | Rear Surface Layer | |
| Friction Coefficient | 0.413 | | 0.611 | |
| Composition of Gasket | NBR Rubber | 6% | NBR Rubber | 15% |
| | NR Rubber | 6% | SBR Rubber | 15% |
| | Aramid Fiber | 10% | Aramid Fiber | 10% |
| | Clay Powder | 28% | Silica Powder | 60% |
| | Mica Powder | 50% | | |

Example 5

TABLE 5

| Ratio of Friction Coefficient | 1.336 | | | |
|---|---|---|---|---|
| Gasket Surface | Front Surface Layer | | Rear Surface Layer | |
| Friction Coefficient | 0.488 | | 0.652 | |
| Composition of Gasket | NBR Rubber | 6% | NBR Rubber | 20% |
| | NR Rubber | 6% | Coumarone-Indene Resin | 5% |
| | Aramid Fiber | 20% | | |
| | Clay Powder | 68% | Silica Powder | 45% |
| | | | Calcium Carbonate Powder | 30% |

Example 6

TABLE 6

| Ratio of Friction Coefficient | 2.158 | | | |
|---|---|---|---|---|
| Gasket Surface | Front Surface Layer | | Rear Surface Layer | |
| Friction Coefficient | 0.311 | | 0.671 | |
| Composition of Gasket | NBR Rubber | 6% | NBR Rubber | 30% |
| | NR Rubber | 6% | CR Latex | 10% |
| | Aramid Fiber | 20% | Aramid Fiber | 10% |
| | Mica Powder | 12% | Silica Powder | 10% |
| | Clay Powder | 21% | Magnesium Carbonate Powder | 40% |
| | Molybdenum Dioxide | 25% | | |
| | PTFE Powder | 10% | | |

Comparative Example 1

TABLE 7

| Ratio of Friction Coefficient | 1.041 | | | |
|---|---|---|---|---|
| Gasket Surface | Front Surface Layer | | Rear Surface Layer | |
| Friction Coefficient | 0.488 | | 0.508 | |
| Composition of Gasket | NBR Rubber | 6% | NBR Rubber | 20% |
| | NR Rubber | 6% | Aramid Fiber | 20% |
| | Aramid Fiber | 20% | Silica Powder | 40% |
| | Clay Powder | 68% | Calcium Carbonate Powder | 20% |

Comparative Example 2

TABLE 8

| Ratio of Friction Coefficient | 1.079 | | | |
|---|---|---|---|---|
| Gasket Surface | Front Surface Layer | | Rear Surface Layer | |
| Friction Coefficient | 0.583 | | 0.629 | |
| Composition of Gasket | NBR Rubber | 6% | NBR Rubber | 15% |
| | NR Rubber | 24% | SBR Rubber | 20% |
| | Aramid Fiber | 5% | Aramid Fiber | 5% |
| | Clay Powder | 65% | Silica Powder | 60% |

Comparative Example 3

TABLE 9

| Ratio of Friction Coefficient | 1.121 | | | |
|---|---|---|---|---|
| Gasket Surface | Front Surface Layer | | Rear Surface Layer | |
| Friction Coefficient | 0.255 | | 0.286 | |
| Composition of Gasket | NBR Rubber | 15% | NBR Rubber | 10% |
| | NR Rubber | 5% | Aramid Fiber | 15% |
| | Aramid Fiber | 10% | Molybdenum Dioxide | 15% |
| | Mica Powder | 25% | | |
| | Molybdenum Dioxide | 10% | PTFE Powder | 10% |
| | | | Silica Powder | 50% |
| | Graphite Powder | 35% | | |

Comparative Example 4

TABLE 10

| Ratio of Friction Coefficient | 1.124 | | | |
|---|---|---|---|---|
| Gasket Surface | Front Surface Layer | | Rear Surface Layer | |
| Friction Coefficient | 0.516 | | 0.580 | |
| Composition of Gasket | NBR Rubber | 6% | NBR Rubber | 14% |
| | NR Rubber | 6% | NR Rubber | 6% |
| | Aramid Fiber | 23% | Aramid Fiber | 20% |
| | Clay Powder | 65% | Silica Powder | 60% |

Comparative Example 5

TABLE 11

| Ratio of Friction Coefficient | 1.149 | | | |
|---|---|---|---|---|
| Gasket Surface | Front Surface Layer | | Rear Surface Layer | |
| Friction Coefficient | 0.516 | | 0.593 | |
| Composition of Gasket | NBR Rubber | 6% | NBR Rubber | 20% |
| | NR Rubber | 6% | Aramid Fiber | 20% |
| | Aramid Fiber | 23% | Silica Powder | 40% |
| | Clay Powder | 65% | Calcium Carborate Powder | 20% |

B. Measurement of Friction Coefficient

As shown in FIG. 3, measurement samples in the shape of a 50 mm square were punched out from each compound sheet at both end portions in the cross direction (the direction perpendicular to reinforcing fibers) and the center portion. After rubber elasticity was imparted to the front surface layer and the rear surface layer by vulcanizing these samples at 130° C. for 30 minutes, a sample S was clamped on a turntable T, previously degreased using acetone, of a friction coefficient measuring device, as shown in FIG. 4A. As shown in FIG. 4B, a positioned probe P was pressed at a load of 3.53 kg (surface pressure of 4.90 MPa) at point a of the sample S, and the turntable T was rotationally reciprocated, so that the probe P relatively moved from point a via point b to point c across reinforcing fibers of the samples. The maximum value of dynamic friction coefficient when the probe P relatively moved from point b to point c was referred to as the friction coefficient of the sample. The atmospheric temperature during measurement was 20±5° C., rotation speed of the turntable T was 24 mm/minute, and the stroke viewed from the front direction of the turntable T was 25 mm.

The above measurement was carried out on three samples and the average of them was referred to as the friction coefficient of the front surface or the rear surface of the sample. The friction coefficients of each sample are given in Tables 1 to 6, and the ratio of friction coefficients of the front surface and the rear surface (friction coefficient of the rear surface / friction coefficient of the front surface) is also given. In addition, samples were also punched out from the compound sheets of Comparative Examples 1 to 5 in the same manner as those of the Examples, the friction coefficients were measured with respect to these samples under the same conditions as the above, and the results are described in Tables 7 to 11.

C. Practical Machine Test

Compound sheet gaskets were produced by punching out compound sheets of Examples 1 to 6 and Comparative Examples 1 to 5, and practical machine tests were carried out on each of the compound sheet gaskets by mounting them between a transmission housing and a cover arranged on the side of a loading axis. In the practical machine test, 1 cycle of loading refers to torque of ±22 kgf·m (215.7 N·m) being added to the loading axis on the compound sheet gaskets, and the occurrence of deformations or cracks in the compound sheet gaskets was examined after loading 3000 cycles thereto. As the result, in Examples 1 to 6 in which the ratio of friction coefficients is 1.15 or more, it was confirmed that deformations and cracks did not occur in the compound sheet gasket at all and the superior seal durability was exhibited. In contrast, in Comparative Examples 1 to 5 in which the ratio of friction resistances is below 1.15, it was demonstrated that deformations and cracks occurred in the compound sheet gasket after loading 150 cycles, and seal durability was remarkably low.

Figure 2:
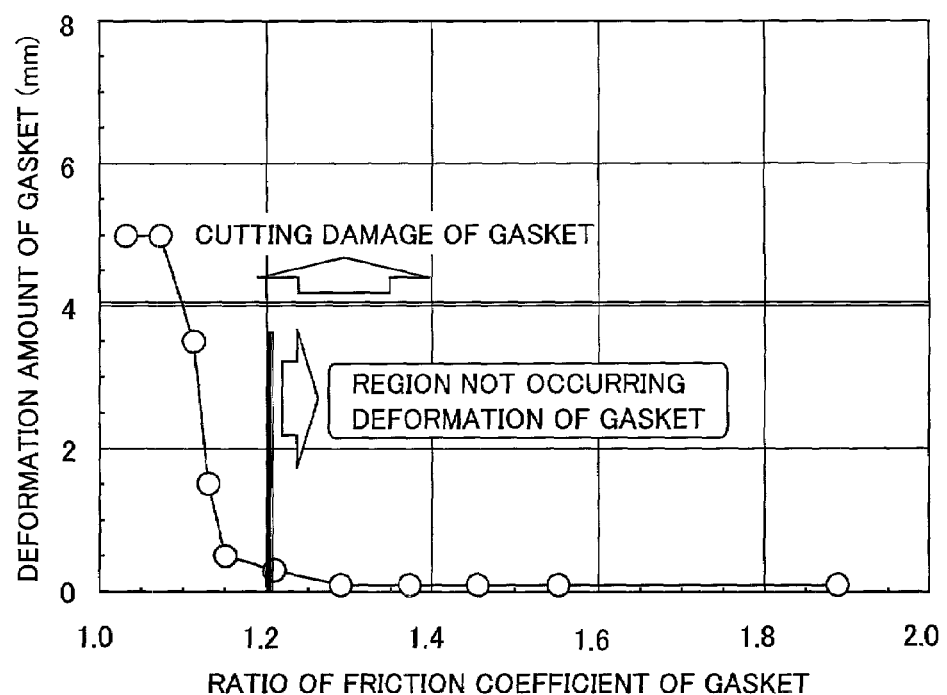
FIG. 2 shows a diagram of the relationships between the ratio of friction coefficient of a compound sheet gasket and deformation amount thereof in Examples of the present invention.
Figure 5A:
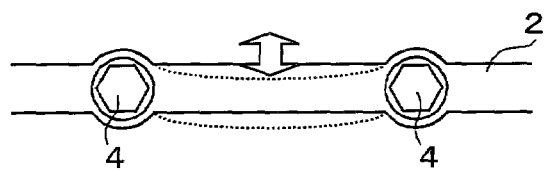
FIG. 5A shows a plan view for explaining a state in which fretting occurs on a flange.
Figure 5B:
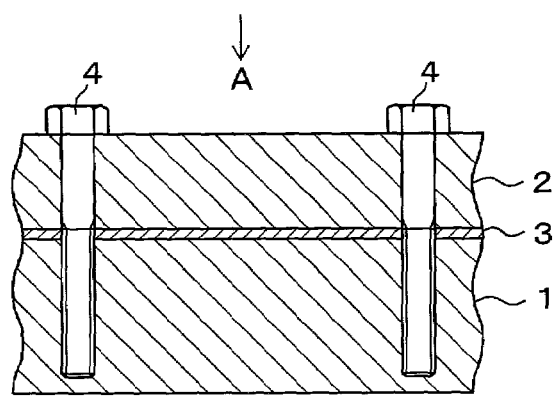
FIG. 5B shows a sectional view of flanges on which a sheet gasket is mounted thereon.
Figure 6A:
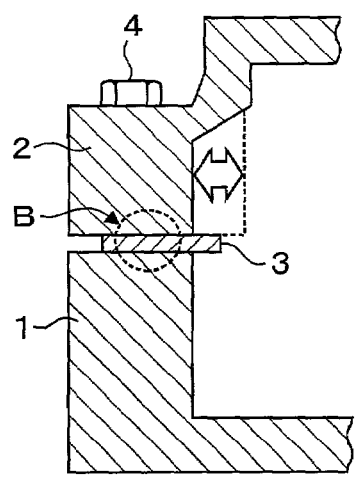
FIG. 6A shows a sectional view of a state in which a conventional sheet gasket is mounted between flanges.
Figure 6B:
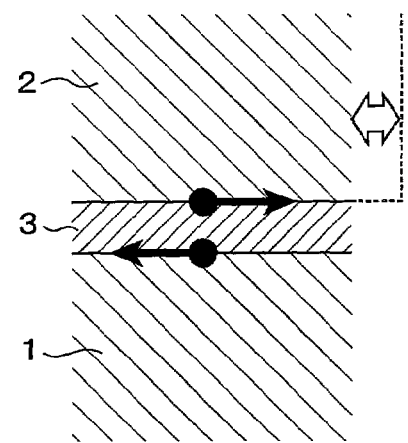
FIG. 6B shows an enlarged view of the area indicated by an arrow B in FIG. 6A.

Next, compound sheet gaskets in which the ratio of friction coefficient differed incrementally were produced, durability tests by loading 3000 cycles were carried out in the same manner as described above, and the relationship between the ratio of friction coefficient and deformation amount of the compound sheet gasket was examined. The results are shown in FIG. 2. As is apparent from FIG. 2, in the case in which the ratio of friction resistances is 1.15 or more, cutting damage did not occur and the sealing property was sufficient. Furthermore, in the case in which the ratio of friction resistances is 1.2 or more, it was demonstrated that there was hardly any deformation of the compound sheet gasket.

As explained above, according to the present invention, a first layer adhered to a housing by the flexibility thereof and a second layer adhered to the cover by the flexibility thereof are provided, and the friction coefficient of any one surface of the first layer and the second layer is set to be 1.15 times or more that of the other, and therefore, an effect in which the sealing property is drastically improved, can be obtained.

What is claimed is:

1. A transmission housing gasket mounted between a housing and a cover provided at an opening of the housing, comprising:
   a first layer fastened to a flange of the housing, and
   a second layer fastened to a flange of the cover, wherein the first layer is constituted by dispersion aramid fibers at 0 to 10% by weight into a binder, and the second layer is constituted by dispersion aramid fibers at 10% by weight or more into a binder, so that a ratio of a coefficient of friction of the surface of the first layer to the surface of the second layer is 1.15 or greater due to the presence of aramid fibers.

2. A transmission housing gasket in accordance with claim 1, wherein the first layer and the second layer are fixed on the front surface and the rear surface of a base layer, respectively.

3. A transmission housing gasket in accordance with claim 1, wherein the binder comprises synthetic rubber as a main component, and the first layer contains the synthetic rubber greater than the second layer.

4. A transmission housing gasket in accordance with claim 2, wherein the binder comprises synthetic rubber as a main component, and the first layer contains the synthetic rubber greater than the second layer.

5. A transmission housing gasket in accordance with claim 1, wherein a friction coefficient of the surface of the first layer is 0.4 or more and a friction coefficient of the surface of the second layer is 0.3 to 0.5.

6. A transmission housing gasket in accordance with claim 2, wherein a friction coefficient of the surface of the first layer is 0.4 or more and a friction coefficient of the surface of the second layer is 0.3 to 0.5.

7. A transmission housing gasket in accordance with claim 3, wherein a friction coefficient of the surface of the first layer is 0.4 or more and a friction coefficient of the surface of the second layer is 0.3 to 0.5.

8. A transmission housing gasket in accordance with claim 4, wherein a friction coefficient of the surface of the first layer is 0.4 or more and a friction coefficient of the surface of the second layer is 0.3 to 0.5.

9. A transmission housing gasket mounted between a housing and a cover provided at an opening of the housing, comprising:
    a first layer fastened to a flange of the housing, and
    a second layer fastened to a flange of the cover,
    wherein the first layer is constituted by dispersing aramid fibers at 10% by weight or more into a binder, and the second layer is constituted by dispersing aramid fibers at 0 to 10% by weight into a binder, so that a ratio of a coefficient of friction of the surface of the second layer to the surface of the first layer is 1.15 or greater due to the presence of aramid fibers.

10. A transmission housing gasket in accordance with claim 9, wherein the first layer and the second layer are fixed on the front surface and the rear surface of a base layer, respectively.

11. A transmission housing gasket in accordance with claim 9, wherein the binder comprises synthetic rubber as a main component, and the second layer contains the synthetic rubber greater than the first layer.

12. A transmission housing gasket in accordance with claim 10, wherein the binder comprises synthetic rubber as a main component, and the second layer contains the synthetic rubber greater than the first layer.

13. A transmission housing gasket in accordance with claim 9, wherein a friction coefficient of the surface of the first layer is 0.3 to 0.5 and a friction coefficient of the surface of the second layer is 0.4 or more.

14. A transmission housing gasket in accordance with claim 10, wherein a friction coefficient of the surface of the first layer is 0.3 to 0.5 and a friction coefficient of the surface of the second layer is 0.4 or more.

15. A transmission housing gasket in accordance with claim 11, wherein a friction coefficient of the surface of the first layer is 0.3 to 0.5 and a friction coefficient of the surface of the second layer is 0.4 or more.

16. A transmission housing gasket in accordance with claim 12, wherein a friction coefficient of the surface of the first layer is 0.3 to 0.5 and a friction coefficient of the surface of the second layer is 0.4 or more.

\* \* \* \* \*